United States Patent
Swanson, Sr. et al.

(10) Patent No.: US 7,707,106 B1
(45) Date of Patent: Apr. 27, 2010

(54) SYSTEM AND METHOD FOR AUTOMATICALLY TRANSFERRING FUNDS BETWEEN ACCOUNTS

(75) Inventors: Daniel Raymond Swanson, Sr., Midlothian, VA (US); Rick L. Morris, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 405 days.

(21) Appl. No.: 11/170,635

(22) Filed: Jun. 29, 2005

(51) Int. Cl.
    *G06Q 40/00* (2006.01)

(52) U.S. Cl. .............................. 705/39; 705/35; 705/37; 705/38

(58) Field of Classification Search .................. None
See application file for complete search history.

(56) References Cited

U.S. PATENT DOCUMENTS

| | | | | |
|---|---|---|---|---|
| 5,677,955 A * | 10/1997 | Doggett et al. | | 705/76 |
| 5,825,856 A | 10/1998 | Porter et al. | | 379/93.12 |
| 6,098,053 A * | 8/2000 | Slater | | 705/44 |
| 6,185,545 B1 | 2/2001 | Resnick et al. | | 705/40 |
| 6,206,283 B1 | 3/2001 | Bansal et al. | | 235/379 |
| 7,415,442 B1 * | 8/2008 | Battaglini et al. | | 705/64 |
| 2002/0107770 A1 | 8/2002 | Meyer et al. | | 705/36 |
| 2002/0123962 A1 | 9/2002 | Bryman et al. | | |
| 2003/0139999 A1 * | 7/2003 | Rowe | | 705/38 |
| 2003/0200163 A1 | 10/2003 | O'Riordan et al. | | 705/35 |
| 2004/0002910 A1 | 1/2004 | Mizukami | | 705/36 |
| 2004/0111370 A1 | 6/2004 | Saylors et al. | | 705/40 |
| 2004/0143532 A1 | 7/2004 | Lee | | 705/35 |
| 2004/0177036 A1 * | 9/2004 | Nutahara et al. | | 705/39 |
| 2005/0167481 A1 * | 8/2005 | Hansen et al. | | 235/379 |
| 2005/0209958 A1 * | 9/2005 | Michelsen et al. | | 705/39 |

FOREIGN PATENT DOCUMENTS

EP 1148453 A3 10/2004
WO WO 2004/084047 A2 9/2004

OTHER PUBLICATIONS

Proquest, Chicago Tribune; Journal Abstract (Summary/Full Article) [online], Sep. 1990 [retrieved Nov. 15, 2007]. Retrieved from Chicago Tribune database. (Document ID: 28879181).*
Toward The Single Account; United States Banker, Company/Corporate Profile/Review; Dec. 16, 1974, pp. 5-6.*

\* cited by examiner

*Primary Examiner*—Kambiz Abdi
*Assistant Examiner*—Benjamin S Fields
(74) *Attorney, Agent, or Firm*—Hunton & Williams LLP

(57) ABSTRACT

According to one embodiment, a method to automatically transfer funds between accounts is provided. The method may include: linking a checking account and a savings account; establishing a maintained balance limit for the checking account; querying the checking account to determine a checking account balance; comparing the checking account balance to the maintained balance limit; and, if the checking account balance exceeds the maintained balance limit, automatically transferring an excess balance to the savings account. According to another embodiment a system for automatically transferring funds is provided. The system may include an account establishment module, an account funds module and an account management module. These module may be able to perform various steps of the method.

16 Claims, 2 Drawing Sheets

SYSTEM AND METHOD FOR AUTOMATICALLY TRANSFERRING FUNDS BETWEEN ACCOUNTS

TECHNICAL FIELD

This invention relates in general to automatic fund transfers between accounts. More particularly, it relates to a system and method for automatically transferring funds based on an account balance.

BACKGROUND

Many consumers today maintain more money in checking accounts or other low-interest accounts than is needed. Transfer of this money to other, higher interest accounts generally requires the consumer to monitor the checking account and initiate or take an active part in the transfer transaction. This level of attention is often burdensome on the consumer and results in suboptimal allocation of monetary assets. Further, should the consumer accidentally transfer too much money to the higher interest account or experience an unexpected withdrawal of funds from the checking account, transferring money from the higher interest account to the checking account is also burdensome and may even result in fees.

SUMMARY

In accordance with the present invention, systems and methods for automatically transferring funds based on an account balance are provided.

In one embodiment the invention includes a method having the steps of: linking a checking account and a savings account; establishing a maintained balance limit for the checking account; querying the checking account to determine a checking account balance; comparing the checking account balance to the maintained balance limit; and, if the checking account balance exceeds the maintained balance limit, automatically transferring an excess balance to the savings account.

In a more specific embodiment, the method may also include: establishing a lower balance limit for the checking account; comparing the checking account balance to the lower balance limit; and, if the checking account balance is below the lower balance limit, automatically transferring a compensatory amount from the savings account.

In another embodiment, the invention provides a system with a savings account provider. The savings account provider may include an account establishment module. This module may be able to: receive a request to establish a savings account for an account holder; establish the requested savings account for the account holder; establish a maintained balance limit for the checking account; and link the savings account to a checking account. The savings account provider may also include an account finding module able to receive into the savings account an automatic transfer from the checking account. Finally, the saving account provider may include an account management module. The account management module may be able to: query the checking account to determine a checking account balance; compare the checking account balance to the maintained balance limit; and, if the checking account balance exceeds the maintained balance limit, automatically transfer an excess balance from the checking account to the account funding module.

In a more specific embodiment, the savings account provider may also include an account establishment module able to establish a lower balance limit for the checking account. The savings account provider may also include an account management module able to: compare the checking account balance to the lower balance limit; and if the checking account balance is below the lower balance limit, automatically transfer a compensatory amount from the savings account.

In yet another embodiment, the invention provides a system with a savings account provider. The savings account provider may include an account establishment means. This means may be able to: receive a request to establish a savings account for an account holder; establish the requested savings account for the account holder; establish a maintained balance limit for the checking account; and link the savings account to a checking account. The savings account provider may also include an account funding means able to receive into the savings account an automatic transfer from the checking account. Finally, the saving account provider may include an account management means. The account management module may be able to: query the checking account to determine a checking account balance; compare the checking account balance to the maintained balance limit; and, if the checking account balance exceeds the maintained balance limit, automatically transfer an excess balance from the checking account to the account funding means.

In a more specific embodiment, the savings account provider may also include an account establishment means able to establish a lower balance limit for the checking account. The savings account provider may also include an account management means able to: compare the checking account balance to the lower balance limit; and if the checking account balance is below the lower balance limit, automatically transfer a compensatory amount from the savings account.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Figure 1:
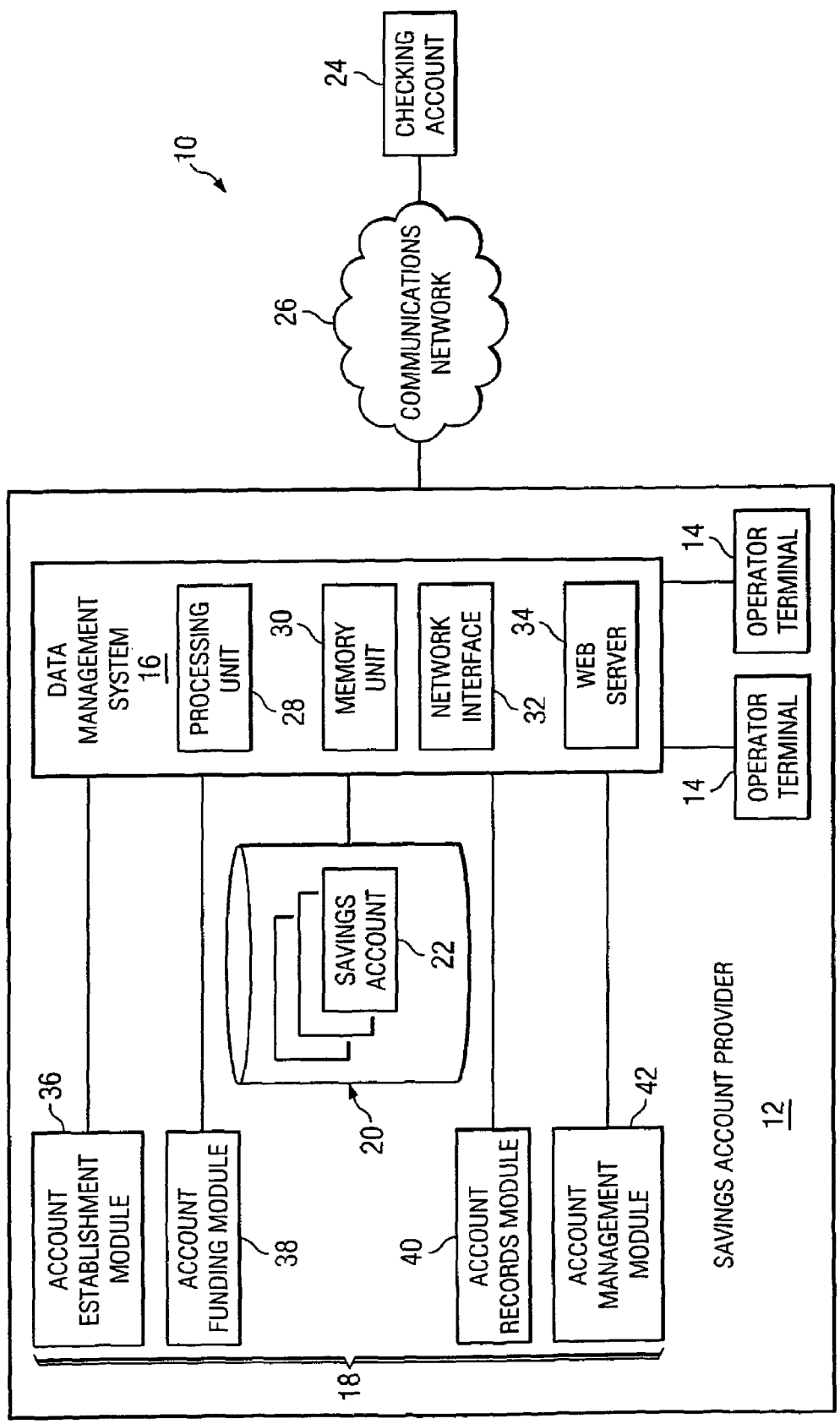
FIG. 1 illustrates an example system for providing and managing automatic transfer of funds from a low interest account to a high interest account in accordance with an embodiment of the invention.
Figure 2:
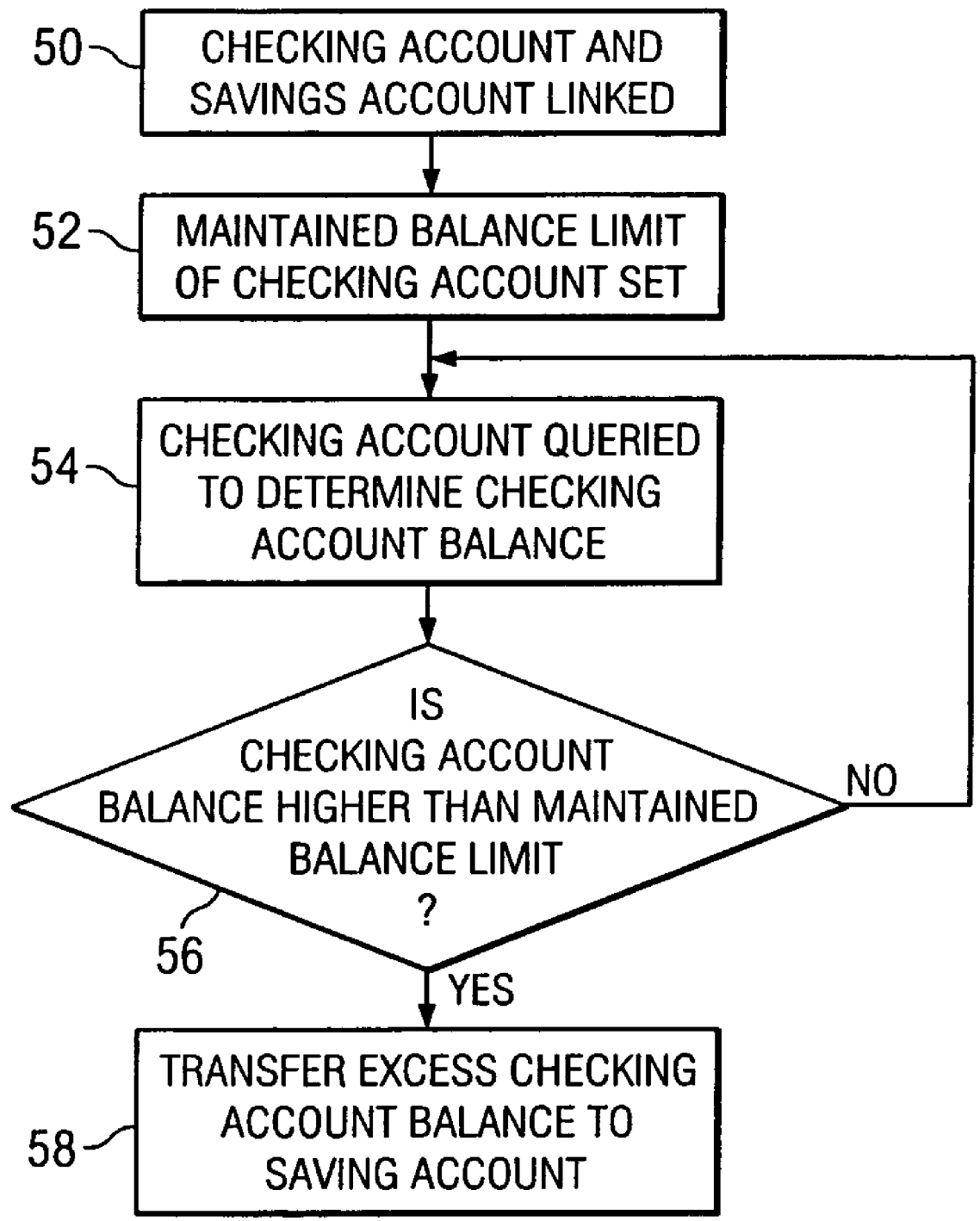
FIG. 2 illustrates an example method of providing and managing a debit automatic funds transfer using the system shown in FIG. 1.

Example embodiments of the present invention and their advantages are best understood by referring now to FIGS. 1 through 2 of the drawings, in which like numerals refer to like parts.

FIG. 1 illustrates an example system 10 of savings account provider 12 in accordance with one embodiment of the invention. According to the illustrated embodiment, account provider 12 may include one or more operator terminals 14, a data management system 16, one or more function modules 18, and an account database 20. The components of account provider 12 may be located at one or more sites and may be coupled to each other using one or more links, each of which may include some or all of a computer bus, local area networks (LANs), metropolitan area networks (MANs), wide area networks (WANs), portions of the Internet, a public switched telephone network (PSTN), any other appropriate wireline, optical, wireless, or other suitable communication link, or any combination of the preceding.

An operator terminal 14 may provide an operator with access to data management system 16 to configure, manage, or otherwise interact with data management system 16. An operator terminal 16 may include a computer system. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

System 10 may be in communication with checking account 24, located at an institution other than savings account provider 12, using communications network 26.

Account database 20 may store various data and/or files regarding each savings account 22 maintained by account provider 12, such as the parameters, the relevant entities, the balance, and the account status of each account 22, for example.

Data management system 16 may manage data associated with savings accounts 22 stored in account database 20, which may in particular embodiments include creating, modifying, and deleting data files associated with savings accounts 22 automatically or in response to data received from the one or more operator terminals 14 or function modules 18, checking account 24, or the account holder 18. These activities may specifically include querying the balance of account 24 and automatically transferring funds from account 24 to account 22 based on savings account parameters. Additionally, data management system 16 may call the one or more function modules 18 to provide particular functionality according to particular needs, as described more fully below. Data management system 16 may include a data processing unit 30, a memory unit 32, a network interface 34, one or more web servers 36 and any other suitable components for managing data associated with savings accounts. The components of data management system 16 may be supported by one or more computer systems at one or more sites. One or more components of data management system 16 may be separate from other components of data management system 16, and one or more suitable components of data management system 16 may, where appropriate, be incorporated into one or more other suitable components of data management system 16.

Data processing unit 28 may process data associated with savings accounts 22, which may include executing coded instructions that may in particular embodiments be associated with the one or more function modules 18. Memory unit 30 may be coupled to data processing unit 28 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Memory unit 30 may be separate from or partially or completely integrated with account database 20. Network interface 32 may provide an interface between data management system 16 and communications network 26 such that data management system 16 may communicate with checking account 25 and/or the account holder 18.

A function module 18 may provide particular functionality associated with handling savings accounts 22 or handling transactions in which money is transferred between checking account 24 and savings account 22. As an example only and not by way of limitation, a function module 18 may provide functionality associated with establishing and managing accounts, risk profiling, and records management. A function module 18 may be called by data management system 16 possibly as a result of data received from an operator terminal 14, a checking account 24, or an account holder. This data may be received via communications network 26. In response, the function module 18 may provide the particular functionality associated with the function module 18 and communicate one or more results to data processing unit 28 or one or more other suitable components of data management system 16. The communicated results may be used to create, modify, or delete one or more data files associated with one or more savings accounts 22, provide data to an operator at an operator terminal 14, or perform any other suitable task.

Function modules 18 are operable to perform various functions in the operation of the system 10. According to the embodiment shown in FIG. 2, function modules 18 include an account establishment module 26, an account funding module 38, an account records module 40, and an account management module 42. Like data management system 16, function modules 18 may be physically distributed such that each function module 18 or multiple instances of each function module 18 may be located in a different physical location geographically remote from each other, from data management system 16, or both. In addition, each function module 18 may be partially or completely integrated with other function modules 18 and/or with other components of account provider 12. For example, particular function modules 18 may include operator terminals 14 such that at least a portion of the functionality of such function modules 18 is provided by human operators. Thus it should be understood that the functionality provided by each of function modules 18 may be completely automated, partially automated, or completely human-controlled.

Account establishment module 36 is operable to cooperate with the account holder to establish savings account 22 for the account holder. Account establishment module 36 may receive requests or applications to establish savings accounts 22 for account holders. For example, the account establishment module 36 may receive a request or application from the account holder to establish a savings account 22 for the account holder. Such request may be received via communications network 26, such as via email, or by telephone or carrier mail. In one embodiment, the account holder may use one or more websites of account provider 12 to request or apply for the establishment of savings account 22.

Account establishment module 36 may determine whether to establish the requested savings account 22 based on various criteria, such as the identity of the account holder, the existence of checking account 24, the balance of checking account 24 and other factors designed to prevent fraud. To establish savings account 22, account establishment module 36 may obtain particular information from the account holder. For example, account establishment module 36 may obtain the name and address of the account holder, as well as the social security numbers of the account holder and the institution name and account number for checking account 24.

In addition, account establishment module 36 may define various parameters, rules and conditions regarding savings account 22. For example, account establishment module 36 may define a maintained balance limit for checking account 24. Money in checking account 24 in excess of this maintained balance limit will be transferred automatically to savings account 22. A lower balance limit may also be set for checking account 24. If the funds in account 24 are less than this lower balance limit, funds may be automatically transferred from savings account 22 to checking account 24.

In addition, account establishment module 36 may define limits regarding the funding of, spending, and withdrawal of funds from savings account 24. In some embodiments, withdrawal of funds from savings account 24 may be limited to certain amounts per transaction or time period, or they may incur a penalty if certain other criteria, such as savings account balance or duration of deposit, are not met. Automatic transfers to and from checking account 24 may be exempt from these limits.

After establishing savings account 22, account establishment module 36 may communicate the routing number for account provider 12, as well as the account number for savings account 22 to the account holder. In addition, account establishment module 36 may generate and/or provide an account card or other account access material to the account holder.

Account funding module 38 is operable to receive money transfers from checking account 24 into savings account 22. Account funding module 38 may also be operable to provide funds for transfer from savings account 22 to checking account 24. Each transfer may be an electronic funds transfer (EFT) between savings account 22 and checking account 24 or any other suitable type of deposit into savings account 22.

Account records module 40 may track account activity regarding savings account 22, generate reports of such account activity, and provide such reports to the account holder. Account activity may include deposits to and withdrawals from savings account 22, such as automatic transfers between savings account 22 and checking account 24, non-automatic transfers, and deposits and withdrawals for savings account 22, and interest paid. Account records module 40 may generate and provide reports periodically, such as monthly or quarterly, for example. Account records module 40 may communicate such reports to the account holder in a variety of manners, such as via email or carrier mail, or by posting the reports to website(s) associated with account provider 12 and allowing the account holder access to such web site(s).

Account management module 42 manages various aspects of savings account 22, such as any of the account parameters discussed above regarding account establishment module 36. Account management module 42 may also establish and manage access to view and/or adjust such account parameters. In particular, account management module 42 may allow the account holder access to adjust one or more parameters associated with the savings account, such as maintained balance limit and lower balance limit. The account holder may communicate such requests in various manners, such as via email, telephone, or through a website which allows the account access to allowance debit account 32.

Account management module 42 may also periodically query checking account 24 to determine the account balance. If the checking account balance is above the maintained balance limit, then account management module 42 may cause excess finds to be automatically transferred to savings account 22. For example, the amount of excess funds transferred may be the amount sufficient to restore checking account 24 to the maintained balance limit. In an alternative embodiment, if the checking account balance is below a lower balance limit, then account management module 42 may transfer funds from savings account 22 to checking account 24. For example, the amount of funds transferred may be the amount sufficient to restore checking account 24 to the lower balance limit, provided that sufficient funds are available in savings account 22.

Account management module 42 may query checking account 24 periodically on a set basis. For example, if may query checking account 24 hourly, daily, nightly, weekly, bi-weekly, monthly, or quarterly. The frequency at which account management module 42 queries check account 24 may be a parameter established using account establishment module 36. The frequency may be changed using account management module 42.

Automatic transfer of funds between checking account 24 and savings account 22 may be effected using the ACH network or other suitable funds transfer network.

FIG. 2 illustrates an example method of providing and managing a savings account 22 using system 10 shown in FIG. 1. At step 50, checking account 24 at institution A is linked to savings account 22 at institution B at the request of the account holder to allow automatic transfer of funds between the accounts such as described above regarding FIG. 1. This step may be preceded by the creation of savings account 22 by account establishment module 36 of account provider 12 the account holder (not shown). Account establishment module 36 may determine various parameters for savings account 22, such as described above regarding FIG. 1.

At step 52, account establishment module 36 sets the maintained balance limit of checking account 24. A lower balance limit may also be set in this or a separate step (not shown).

At step 54, account management module 42 queries checking account 24 to determine its balance. Such query is preferably electronic and via communications network 26. The query may be performed periodically as described with respect to FIG. 1.

In step 56, the account management module 42 compares the balance of checking account 24 to the maintained balance limit. If the balance of checking account 24 exceeds the maintained balance limit, then in step 58 excess funds are transferred from checking account 24 to savings account 22. The amount of funds transferred may be the amount sufficient to restore checking account 24 to the maintained balance limit. If, in step 56, the balance of checking account 24 does not exceed the maintained balance limit, then at some later point step 54 may be repeated.

In an optional embodiment, now explicitly show, after step 54 the balance of checking account 24 may be compared to the lower balance limit. If the balance of checking account 24 is less than the lower balance limit, funds may be transferred from savings account 22 to checking account 24. For example, the amount of funds transferred may be the amount sufficient to restore checking account 24 to the lower balance limit, provided that sufficient funds are available in savings account 22. If the balance of checking account 24 is above the lower balance limit, then at some later point step 54 may be repeated.

Although checking accounts are used in the examples above, it will be understood that any accounts from which an account holder may wish to automatically transfer excess finds may be used. For example, any sort of low-interest account may substitute for a checking account in the above examples.

Similarly, it will be understood that any account to which an account holder may wish to transfer funds may be used in place of the savings account in the above examples. For example, a high interest account such as a high yield savings account or money market account may substitute for a savings account in the above examples.

Accounts may be located at any type of financial institution including banks, credit unions and brokerage firms.

Although only one savings account and one checking account are used in the embodiments described above, it will be understood that multiple savings accounts and checking accounts may be linked. Various algorithms may be used to determine balance limits and allocate any transferred finds. Further although the accounts in the above embodiments are all owned by the same account holder, it will be understood that one or more of the checking and/or savings accounts may belong to different account holders. The transfer of money between accounts would be governed by all appropriate Anti-money Laundering (AML) regulations, and Office of Foreign Asset control (OFAC) guidelines and regulations. In one embodiment, such an arrangement may be useful, for example, in providing accounts for children of a primary account holder.

Finally, although in the above embodiments the checking and savings accounts are at different financial institutions, it is possible in some embodiments that both accounts may be at the same institution.

Modifications, additions, or omissions may be made to the method without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:

1. A method, comprising: receiving by one or more computers a request at a savings account provider to establish a savings account for an account holder over a communications network; establishing by the one or more computers the requested savings account for the account holder; establishing by the one or more computers a monetary limit for funds that can be transferred from the savings account to a checking account, the savings account being maintained at a specific institution entity that is different than the institution entity maintaining the checking account; linking the checking account and the savings account by the one or more computers; receiving by the one or more computers a request to establish a set time period to query the checking account to determine a checking account balance; establishing by the one or more computers the set time period to query the checking account to determine the checking account balance; establishing by the one or more computers a maintained balance limit for the checking account; establishing by the one or more computers a lower balance limit for the checking account; querying the checking account at the set time period by the one or more computers to determine the checking account balance; comparing the checking account balance by the one or more computers to the maintained balance limit using the processor; comparing the checking account balance by the one or more computers to the lower balance limit using the processor; automatically transferring an excess balance to the savings account when the checking account balance exceeds the maintained balance limit; and automatically transferring a compensatory amount from the savings account to the checking account when the checking account balance is below the lower balance limit.

2. The method of claim 1, wherein the excess balance equals the difference between the maintained balance limit and the checking account balance.

3. The method of claim 1, wherein transferring the excess balance to the savings account when the checking account balance exceeds the maintained balance limit comprises an electronic funds transfer.

4. The method of claim 1, wherein transferring the excess balance to the savings account when the checking account balance exceeds the maintained balance limit comprises using the ACH network.

5. The method of claim 1, wherein transferring the excess balance to the savings account when the checking account balance exceeds the maintained balance limit comprises using the internet.

6. The method of claim 1, further comprising: tracking account activity of the savings account by using the one or more computers; and generating a report of the tracked account activity by using the one or more computers.

7. The method of claim 1, wherein the compensatory amount equals the difference between the lower balance limit and the checking account balance.

8. The method of claim 1, wherein querying occurs at a time period selected from the group selected from: hourly, daily, nightly, weekly, monthly and quarterly.

9. A computer-implemented system comprising a savings account provider, the account provider including: an account establishment module operable to: receive a request to establish a savings account for an account holder over a communications network; establish the requested savings account for the account holder; establish a monetary limit for funds that can be transferred from the savings account to a checking account, the savings account being maintained at a specific institution entity that is different than the institution entity maintaining the checking account; establish a maintained balance limit for the checking account; establish a lower balance limit for the checking account; receive a request to establish a set time period to query the checking account to determine a checking account balance over the communications network; and establish the set time period to query the checking account to determine the checking account balance; a processor operable to link the savings account to the checking account; a database operable to store information associated with the savings account, and the checking account; an account management module operable to: query the checking account at the set time period to determine the checking account balance; compare the checking account balance to the maintained balance limit; compare the checking account balance to the lower balance limit; automaticallytransfer an excess balance to the savings account when the checking account balance exceeds the maintained balance limit; and automatically transfer a compensatory amount from the savings account to the checking account when the checking account balance is below the lower balance limit.

10. The system of claim 9, wherein the excess balance equals the difference between the maintained balance limit and the checking account balance.

11. The system of claim 9, wherein the automatic transfer comprises an electronic funds transfer.

12. The system of claim 9, wherein the automatic transfer comprises using the ACH network.

13. The system of claim 9, wherein the automatic transfer comprises using the internet.

14. The system of claim 9, wherein the compensatory amount equals the difference between the lower balance limit and the checking account balance.

15. The system of claim 9, wherein the set time period is selected from the group selected from: hourly, daily, nightly, weekly, monthly and quarterly.

16. The system of claim 9, further comprising a data management system operable to manage data associated with the savings account.

* * * * *